US010054626B2

(12) United States Patent
Toyama et al.

(10) Patent No.: US 10,054,626 B2
(45) Date of Patent: Aug. 21, 2018

(54) FAILURE RATE CALCULATION DEVICE (71) Applicant: Mitsubishi Aircraft Corporation, Aichi (JP)

(72) Inventors: Koji Toyama, Tokyo (JP); Yoshihiro Nakayama, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 177 days.

(21) Appl. No.: 15/045,646

(22) Filed: Feb. 17, 2016

(65) Prior Publication Data
US 2016/0282401 A1    Sep. 29, 2016

(30) Foreign Application Priority Data

Mar. 24, 2015   (JP) .................................. 2015-060268

(51) Int. Cl.
*G01R 31/04* (2006.01)
*G01R 31/02* (2006.01)
*G06F 17/50* (2006.01)

(52) U.S. Cl.
CPC .......... *G01R 31/04* (2013.01); *G01R 31/021* (2013.01); *G01R 31/045* (2013.01); *G06F 17/509* (2013.01); *G06F 2217/36* (2013.01)

(58) Field of Classification Search
CPC ...... G01R 31/045; G01R 31/04; G06F 17/509
USPC .......................................................... 324/538
See application file for complete search history.

(56) References Cited

U.S. PATENT DOCUMENTS

| | | | | |
|---|---|---|---|---|
| 5,623,199 A | * | 4/1997 | Taniguchi | G01R 31/04 324/538 |
| 8,823,386 B2 | * | 9/2014 | Funakoshi | G01R 31/021 324/538 |
| 2009/0265119 A1 | * | 10/2009 | Bhattacharya | G06Q 10/06 702/34 |
| 2013/0069668 A1 | * | 3/2013 | Funakoshi | G01R 31/021 324/543 |
| 2014/0088919 A1 | | 3/2014 | Toyama et al. | |
| 2014/0218046 A1 | | 8/2014 | Nakayama et al. | |
| 2014/0297207 A1 | | 10/2014 | Toyama et al. | |

FOREIGN PATENT DOCUMENTS

| | | |
|---|---|---|
| JP | 5182973 B1 | 4/2013 |
| JP | 2014-061841 A | 4/2014 |
| JP | 2014-194676 A | 10/2014 |

* cited by examiner

*Primary Examiner* — Amy He
(74) *Attorney, Agent, or Firm* — Pearne & Gordon LLP

(57) ABSTRACT

A failure rate calculation device calculates the failure rate of a wire harness of which each of a plurality of electrical wires is connected with connectors via relay points, the device including: a storage unit which stores electrical wire-connector connection information in which each of the plurality of electrical wires and the connectors are associated with each other and in which type information on each of the electrical wires and type information on each of the connectors are associated with each other, and failure rate information in which the type information belonging to the electrical wire-connector connection information and failure rate factors, associated with the type information, are associated with each other; and a processing unit which, when the wire harness is specified, checks the electrical wire-connector connection information and the failure rate information against each other and calculates a failure rate in the wire harness.

20 Claims, 10 Drawing Sheets

HARNESS ID:WH1

| No. | WIRE ID | ITEM-1 | PIN-1 | ITEM-2 | PIN-2 | Leng. | WIRE CODE | CON. CODE | |
|---|---|---|---|---|---|---|---|---|---|
| 1 | W1 | C1 | 1 | C2 | 1 | L1 | #W1 | #C1 | #C2 |
| 2 | W2 | | 2 | | 2 | L1 | | | |
| 3 | W3 | | 3 | | 3 | L1 | | | |
| 4 | W4 | | 4 | C3 | 1 | L2 | | | #C3 |
| 5 | W5 | | 5 | | 2 | L2 | | | |
| 6 | W6 | | 6 | C4 | 1 | L3 | #W2 | | #C4 |
| 7 | W7 | | 7 | | 2 | L3 | | | |
| 8 | W8 | | 8 | | 3 | L3 | | | |
| 9 | W9 | C2 | 4 | C3 | 3 | L4 | #W3 | #C2 | #C3 |
| 10 | W10 | | 5 | | 4 | L4 | | | |
| 11 | W11 | | 6 | C4 | 4 | L5 | | | #C4 |
| 12 | W12 | | 7 | | 5 | L5 | | | |
| 13 | W13 | C3 | 5 | C4 | 6 | L6 | #W4 | #C3 | #C3 |

FIG. 4

| WIRE CODE | Mw  | d  |
|-----------|-----|----|
| #W1       | Mw1 | d1 |
| #W2       | Mw2 | d2 |
| #W3       | Mw3 | d3 |
| #W4       | Mw4 | d4 |

| CON. CODE | Mc  | PIN USED              | PIN NOT USED |
|-----------|-----|-----------------------|--------------|
| #C1       | Mc1 | 1, 2, 3, 4, 5, 6, 7, 8 | 9, 10        |
| #C2       | Mc2 | 1, 2, 3, 4, 5, 6, 7    | 8            |
| #C3       | Mc3 | 1, 2, 3, 4, 5          | 6, 7, 8      |
| #C4       | Mc4 | 1, 2, 3, 4, 5, 6       | 7, 8         |

FIG. 5

| Bundle Section | ITEM1 | ITEM2 | LENG. |
|---|---|---|---|
| B1 | C1 | A1 | LB1 |
| B2 | C2 | A1 | LB2 |
| B3 | A1 | A2 | LB3 |
| B4 | A2 | C3 | LB4 |
| B5 | A2 | C4 | LB5 |

FIG. 6

| No. | END1 | END2 | SECTION | #W1 | #W2 | #W3 | #W4 | SECTION | #W1 | #W2 | #W3 | #W4 | SECTION | #W1 | #W2 | #W3 | #W4 |
|---|---|---|---|---|---|---|---|---|---|---|---|---|---|---|---|---|---|
| 1 | C1 | C2 | B1 | 3 |  |  |  | B2 | 3 |  |  |  | – |  |  |  |  |
| 2 | C1 | C3 | B1 | 1 | 1 |  |  | B3 | 1 | 1 |  |  | B4 | 1 | 1 |  |  |
| 3 | C1 | C4 | B1 |  | 3 |  |  | B3 |  | 3 |  |  | B5 |  | 3 |  |  |
| 4 | C2 | C3 | B2 |  |  | 2 |  | B3 |  |  | 2 |  | B4 |  |  | 2 |  |
| 5 | C2 | C4 | B2 |  |  | 2 |  | B3 |  |  | 2 |  | B5 |  |  | 2 |  |
| 6 | C3 | C4 | B3 |  |  |  | 1 | B4 |  |  |  | 1 | – |  |  |  |  |

FIG. 7

| No. | Bundle Section | ITEM1 | ITEM2 | Bundle Size [in.] | TOTAL NUMBER | ELECTRICAL WIRE ||||
|---|---|---|---|---|---|---|---|---|---|
| | | | | | | #W1 | #W2 | #W3 | #W4 |
| 1 | B1 | C1 | A1 | XXX | 8 | 4 | 4 | 0 | 0 |
| 2 | B2 | C2 | A1 | XXY | 7 | 3 | 0 | 4 | 0 |
| 3 | B3 | A1 | A2 | XYY | 10 | 1 | 4 | 4 | 1 |
| 4 | B4 | A2 | C5 | YYY | 5 | 1 | 1 | 2 | 1 |
| 5 | B5 | A2 | C4 | YYX | 5 | 0 | 3 | 2 | 0 |

FIG. 8A

| No. | END1 | END2 |
|---|---|---|
| | ITEM1 | ITEM2 |
| 1 | C1 | C2 |
| 2 | C1 | C3 |
| 3 | C1 | C4 |
| 4 | C2 | C3 |
| 5 | C2 | C4 |
| 6 | C3 | C4 |

FIG. 8B

| No. | ITEM1 | ITEM2 | λ total | λ w | λ c |
|---|---|---|---|---|---|
| 1 | C1 | A1 | **** | **** | **** |
| 2 | C1 | A1 | **** | **** | **** |
| 3 | C1 | A1 | **** | **** | **** |
| 4 | C2 | A1 | **** | **** | **** |
| 5 | C2 | A1 | **** | **** | **** |
| 6 | C3 | A2 | **** | **** | **** |

FIG. 8C

| No. | ITEM1 | ITEM2 | λ total | λ w | λ c |
|---|---|---|---|---|---|
| 1 | A1 | C2 | **** | **** | **** |
| 2 | A1 | A2 | **** | **** | **** |
| 3 | A1 | A2 | **** | **** | **** |
| 4 | A1 | A2 | **** | **** | **** |
| 5 | A1 | A2 | **** | **** | **** |
| 6 | A2 | C4 | **** | **** | **** |

FIG. 8D

| No. | ITEM1 | ITEM2 | λ total | λ w | λ c |
|---|---|---|---|---|---|
| 1 | | | − | | |
| 2 | A2 | C3 | **** | **** | **** |
| 3 | A2 | C4 | **** | **** | **** |
| 4 | A2 | C3 | **** | **** | **** |
| 5 | A2 | C4 | **** | **** | **** |
| 6 | | | − | | |

FIG. 9

| No. | END1 | END2 | λ_total | λ_w | λ_c |
|---|---|---|---|---|---|
| 1 | C1 | C2 | n1 × 10⁻⁶ | n11 × 10⁻⁶ | n12 × 10⁻⁶ |
| 2 | C1 | C3 | n2 × 10⁻⁶ | n21 × 10⁻⁶ | n22 × 10⁻⁶ |
| 3 | C1 | C4 | n3 × 10⁻⁶ | n31 × 10⁻⁶ | n32 × 10⁻⁶ |
| 4 | C2 | C3 | n4 × 10⁻⁶ | n41 × 10⁻⁶ | n42 × 10⁻⁶ |
| 5 | C2 | C4 | n5 × 10⁻⁶ | n51 × 10⁻⁶ | n52 × 10⁻⁶ |
| 6 | C3 | C4 | n6 × 10⁻⁶ | n61 × 10⁻⁶ | n62 × 10⁻⁶ |
| TOTAL | WH1 | | n7 × 10⁻⁶ | n71 × 10⁻⁶ | n72 × 10⁻⁶ |

FIG. 10

FAILURE RATE CALCULATION DEVICE

BACKGROUND OF THE INVENTION

Field of the Invention

The present invention relates to a device for calculating a failure rate in a wire harness which includes electrical wires connecting a plurality of electronic devices with one another via connectors.

Description of the Related Art

A wiring system which is configured by interconnecting, for example, an input device, a control device, and an output device through a wire harness (hereinafter simply "harness") needs to be checked, after the system has been assembled, as to whether the electrical wires composing the harness are connected in a proper route. However, when the system has large numbers of harnesses (wires) and terminal devices, such as input devices, or relay devices, it is not easy to check the validity of the connection route from a wiring diagram spreading over multiple sheets, or to confirm the safety of the wiring.

Therefore, the present applicants have hitherto proposed the following systems: a wiring connection check system whereby a connection route can be easily checked by the unit of a single wire even when the wiring system is large (Japanese Patent No. 5182973); a system whereby those harnesses at risk of including a combination of electrical wires which are not allowed to fail at the same time and those harnesses at risk of impairing the safety if they fail at the same time are easily extracted (Japanese Patent Laid-Open No. 2014-61841); and a system whereby the safety of wiring can be qualitatively analyzed even when the wiring structure is complicated (Japanese Patent Laid-Open No. 2014-194676).

The techniques proposed in the above disclosures are based on a principle that information showing the connection of any complicated wiring can be summarized into information on either of the following (a) and (b):

(a) Connector and electrical wire (b) Connector and terminal device or relay device Further developing the preceding proposals, the present invention aims to provide a device which can easily calculate the failure rate of a wire harness.

SUMMARY OF THE INVENTION

To achieve the above object, the present invention provides a device which calculates the failure rate of a wire harness of which each of a plurality of electrical wires is connected via a relay element with a pair of connectors located at terminal ends of the electrical wires, the device including: a storage unit which stores electrical wire-connector connection information in which each of the plurality of electrical wires and the pair of connectors are associated with each other and in which type information on the electrical wires and type information on the connectors are associated with each other, and failure rate information in which the type information on the electrical wires and the type information on the connectors belonging to the electrical wire-connector connection information and failure rate factors, which are associated with the type information, are associated with each other; and a processing unit which, when the wire harness is specified, checks the electrical wire-connector connection information and the failure rate information against each other and calculates a failure rate associated with the wire harness.

According to the present invention, the electrical wire-connector connection information includes the type information, and this type information is linked to the failure rate information stored in the storage unit, so that the failure rate associated with the harness can be easily calculated. By performing this calculation for all the harnesses included in a system to be analyzed, it is possible to easily confirm the validity of the wiring design of that system.

Even when a design change is made, a failure rate in the harness can be easily calculated thereafter as well by reflecting the design change in the electrical wire-connector connection information.

In the present invention, the processing unit can check the electrical wire-connector connection information about the type information on the electrical wires and the failure rate information about the electrical wires against each other and calculate a second failure rate associated with the electrical wires.

Moreover, in the present invention, the processing unit can check the electrical wire-connector connection information about the type information on the connectors and the failure rate information about the connectors against each other and calculate a third failure rate associated with the connectors.

Then, in the present invention, the processing unit can calculate a first failure rate as the total of the second failure rate and the third failure rate.

Usually, the first failure rate is used when determining the failure rate of a wire harness as a whole, although the second failure rate associated with the electrical wires and the third failure rate associated with the connectors are also both useful information in designing the installation of wire harnesses. Therefore, the failure rate calculation device of the present invention embraces a form in which only the second failure rate or the third failure rate is calculated, and further embraces a form in which the first failure rate is calculated by summing up the calculated second failure rate and third failure rate.

In the present invention, the storage unit stores, as the electrical wire-connector connection information, length information in which the plurality of electrical wires and their respective lengths are associated with each other, and the processing unit can calculate the second failure rate taking into account the length information.

In the present invention, the processing unit can calculate the second failure rate by the unit of a bundle which is a bundle of the electrical wires interposed between one or both of the pair of connectors and the relay elements.

In the failure rate calculation device of the present invention, the storage unit stores bundle connection information which shows a connection relation between the bundles and one or both of the connectors and the relay elements in the wire harness, and the processing unit can calculate the failure rate by further checking the bundle connection information.

According to the present invention, the electrical wire-connector connection information includes the type information, and this type information is linked to the failure rate information stored in the storage unit, so that a failure rate in the harness can be easily calculated. By performing this calculation for all the harnesses which include any one or a plurality of electrical wires involved in a function to be analyzed, it is possible to easily confirm the design validity of wires involved in the system, for example, the validity of the arrangement in terms of the ductility and flexibility of the wires when the wires are arranged with a certain radius of curvature. Furthermore, in this system, a part of the harnesses where the failure rate is higher can be identified and specified, so that effective measures for lowering the failure rate, i.e., enhancing the reliability of the wires involved in the system can be reflected in the design.

Of course, even when a design change is made, a failure rate in the harness can be easily calculated thereafter as well by reflecting the design change in the electrical wire-connector connection information.

DETAILED DESCRIPTION OF THE PREFERRED EMBODIMENTS

A failure rate calculation device 10 according to this embodiment is a system for calculating the failure rate of a wiring system which is composed of harnesses interconnecting an input device, a control device, and an output device. The failure rate calculation device 10 calculates the failure rate of a harness by specifying the harness of which the failure rate is to be calculated.

Figure 1A:
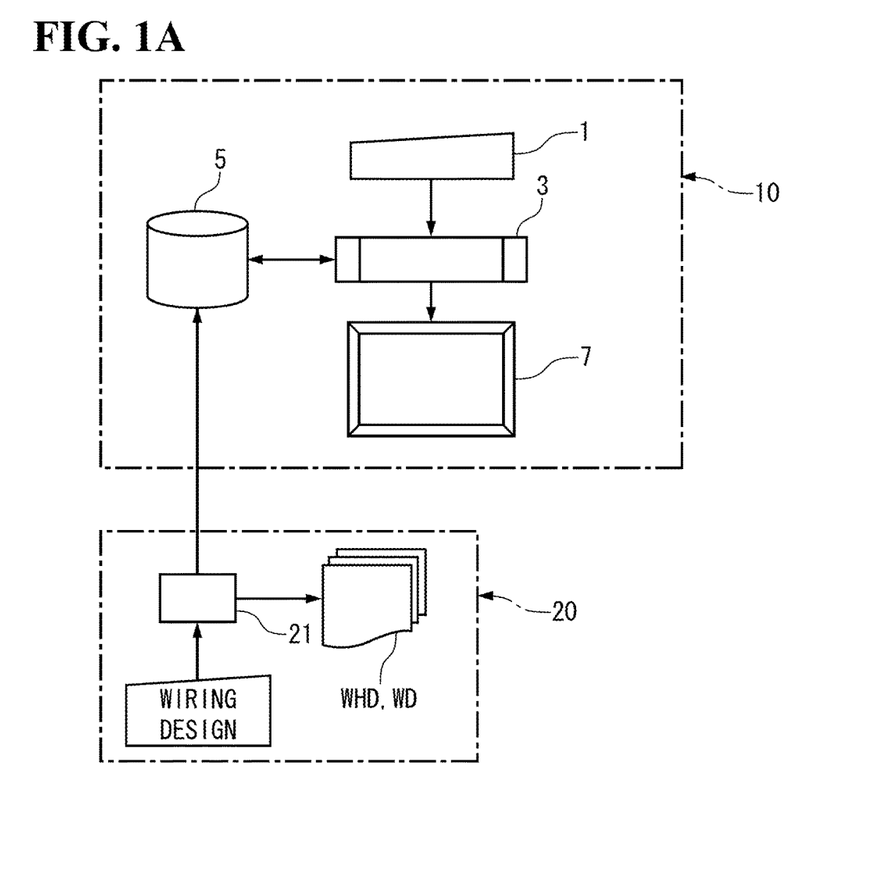
FIGS. 1A and 1B are views each showing the general configuration of a failure rate calculation system in an embodiment.

As shown in FIG. 1A, the failure rate calculation device 10 according to this embodiment includes an input unit 1, a processing unit 3, a storage unit 5, and a display unit 7. The failure rate calculation device 10 can be configured by a personal computer or other computer devices.

The failure rate calculation device 10 is connected with a wiring drawing system 20. The wiring drawing system 20 is also configured by a computer device.

Here, a harness is an assembly of connectors and electrical wire bundles (bundles). Each electrical wire is electrically connected with a pin (or a terminal) of the connectors.

[Outline of Configuration of Failure Rate Calculation Device 10]

The input unit 1 is a part through which commands required for calculating a failure rate in the failure rate calculation device 10 are input. The input unit 1 can be configured by a keyboard as the input device of a computer.

The processing unit 3 retrieves information stored in the storage unit 5 according to a command from the input unit 1, executes a process required for calculating a failure rate, and displays calculation results on the display unit 7.

Figure 1B:
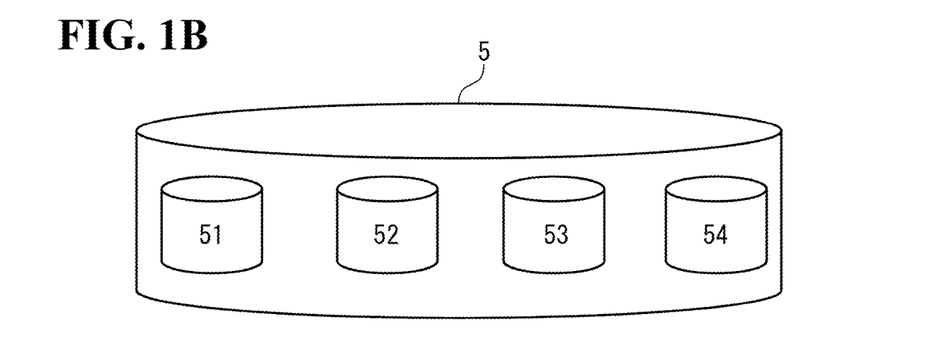

The storage unit 5 has a plurality of databases for storing various pieces of information required for calculating a failure rate. As shown in FIG. 1B, these databases include a connection information database 51, a component information database 52, a bundle connection information database 53, and a calculation result database 54. The division of the storage unit 5 into these databases is to make the description easy to understand; as long as necessary information is included, the division is arbitrary, and this division is not intended to show that the storage unit 5 is physically divided. The storage unit 5 may include, in addition to these databases, a part where various pieces of information are stored. One example is a part which stores an algorithm required for the processing unit 3 to calculate a failure rate.

The display unit 7 displays processing results of the processing unit 3. The display unit 7 is configured by a display as the display device of a computer.

[Outline of Wiring Drawing System 20]

The wiring drawing system 20 includes a computer aided design (CAD) 21. The CAD 21 acquires connection/position information on system components pertinent to wiring design work, and creates wire harness diagrams (WHDs) and wiring diagrams (WDs). Here, WHDs are diagrams showing the connection relation between connectors and bundles (including bundle sections and nodes), while WDs are diagrams showing the connection relation between electrical wires and connectors included in a harness.

The CAD 21 generates electrical wire-connector connection information from acquired WHDs and WDs, and provides the information to the connection information database 51 of the failure rate calculation device 10. The connection information database 51 stores the electrical wire-connector connection information provided from the CAD 21.

[Wiring Example]

Figure 2:
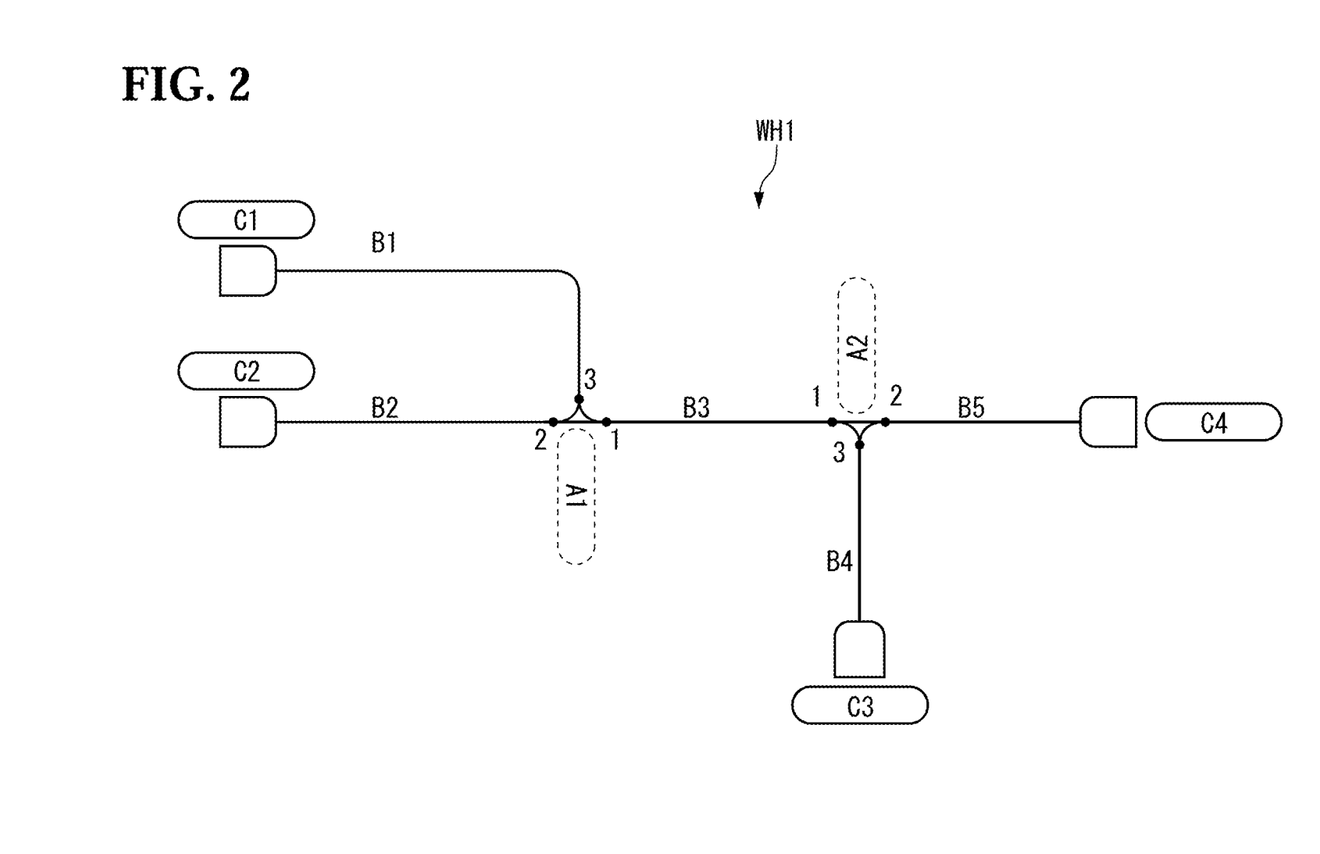
FIG. 2 is a view showing an example of wiring of which the failure rate is to be calculated in the embodiment.

FIG. 2 shows one example of a harness of which the failure rate is calculated in this embodiment. This wiring example corresponds with the above-mentioned wire harness diagram (WHD). Here, the numbers of the connectors and the bundles, which are components of the wiring example, are minimized for easy understanding, but this embodiment can be applied to a larger wiring system as well.

In a harness WH1 of FIG. 2, four connectors, a connector C1, a connector C2, a connector C3, and a connector C4, are interconnected via a bundle B1, a bundle B2, a bundle B3, a bundle B4, and a bundle B5, as well as via a relay point A1 and a relay point A2. While only the connectors are shown at all the terminal ends here, these connectors C1 to C4 are usually attached to devices such as an input device, a control device, and an output device, or attached to relay connectors which interconnect a plurality of harnesses. The relay points A1 to A2 are identification information on a branching position and a joining position of a plurality of bundles.

In the harness WH1, the connector C1 and the connector C2 are connected with the bundle B1 and the bundle B2, respectively. The bundle B1 is coupled to a pin 3 of the relay point A1, and the bundle B2 is coupled to a pin 2 of the relay point A1, so that the relay point A1 serves as a transit point or a contact point between the bundle B1 and the bundle B2.

Similarly, the relay point A1 and the relay point A2 are connected with each other through the bundle B3, and the bundle B3 has one end coupled to a pin 1 of the relay point A1 and the other end coupled to a pin 1 of the relay point A2.

The connector C3 is connected with the bundle B4. The bundle B4 has one end coupled to a pin 3 of the relay point A2 and the other end coupled to the connector C3.

The connector C4 is connected with the bundle B5. The bundle B5 has one end coupled to a pin 2 of the relay point A2 and the other end coupled to the connector C4.

The bundle B1 to bundle B5 each include a plurality of electrical wires, which will be described later.

[Failure Rate Calculation]

Calculation of a failure rate associated with the harness WH1 will be described below with reference to FIG. 3 to FIG. 10.

First, referring to FIG. 10, the outline of the failure rate calculation procedure will be described.

The sequence of procedure is started by inputting identification information on a harness (hereinafter, "harness ID"), of which the failure rate is to be calculated, from the input unit 1 (S101 of FIG. 10). The harness ID is information given to each harness for identification, and here the harness ID "WH1" is input according to the wiring example of FIG. 2. The harness ID having been input is sent to the processing unit 3.

Figure 3:
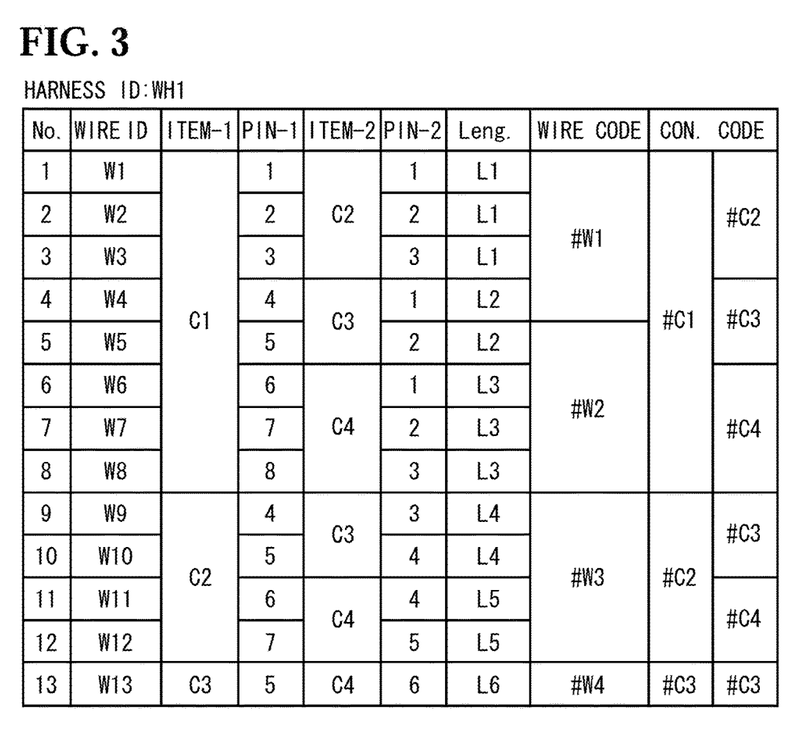
FIG. 3 is a view showing connection information in which electrical wires and connectors are associated with each other.
Figure 10:
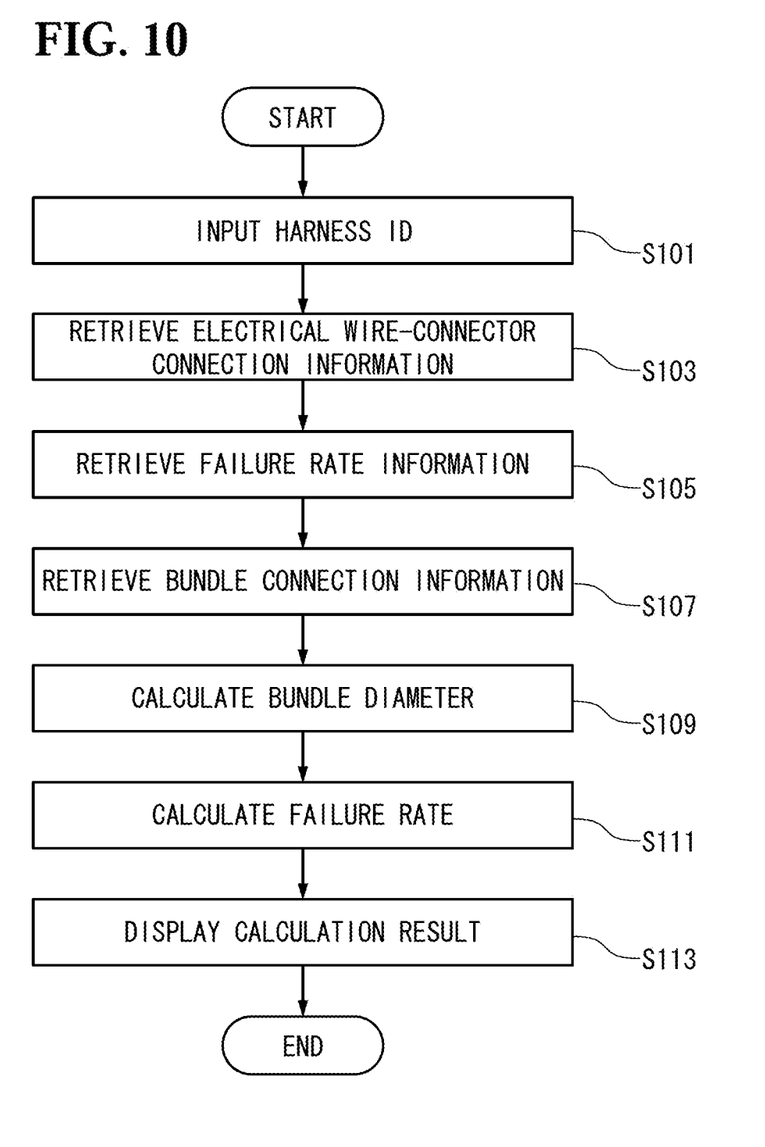
FIG. 10 is a flowchart showing a failure rate calculation procedure in the embodiment.

Having acquired the harness ID, the processing unit 3 retrieves electrical wire-connector connection information associated with this harness ID (WH1) from the connection information database 51 of the storage unit 5 (S103 of FIG. 10, FIG. 3). The processing unit 3 checks the retrieved electrical wire-connector connection information, and retrieves failure rate information from the component information database 52 of the storage unit 5. This failure rate information is information about which electrical wire is made of what material, and is information in which type information on the connectors C1 to C4 belonging to the harness WH1 and type information on electrical wires W1 to W13 belonging to the harness WH1, and failure rate factors, such as materials and wire diameters of these connectors and electrical wires, are associated with each other (S105 of FIG. 10, FIG. 4).

Figure 5:
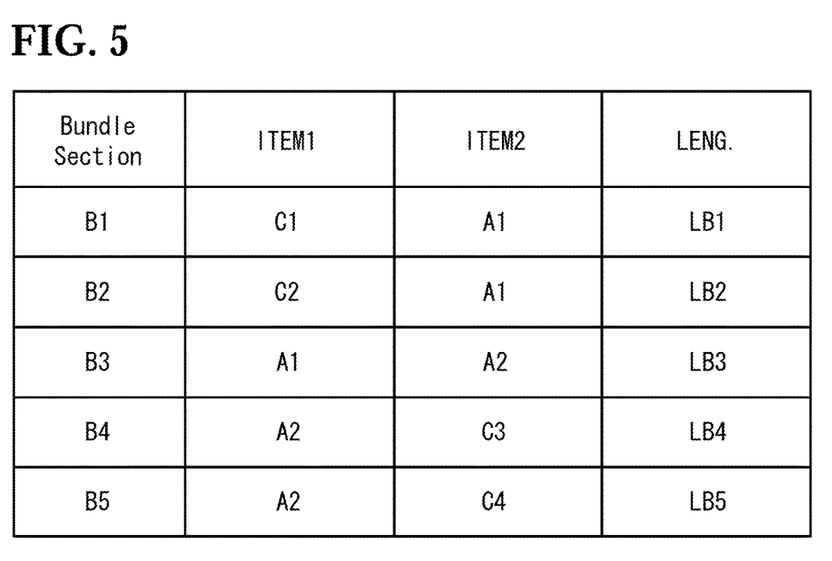
FIG. 5 is a view showing bundle connection information in which identification information on bundles and identification information on pairs of connectors are associated with each other.

Next, the processing unit 3 retrieves bundle connection information on the harness WH1 from the bundle connection information database 53 of the storage unit 5 (S107 of FIG. 10, FIG. 5).

As shown in FIG. 5, the bundle connection information is information in which each of the bundles B1 to B5 and the connectors and the relay points connected at both ends of the bundle are associated with each other, and this bundle connection information also indicates the length of each bundle.

Figure 6:
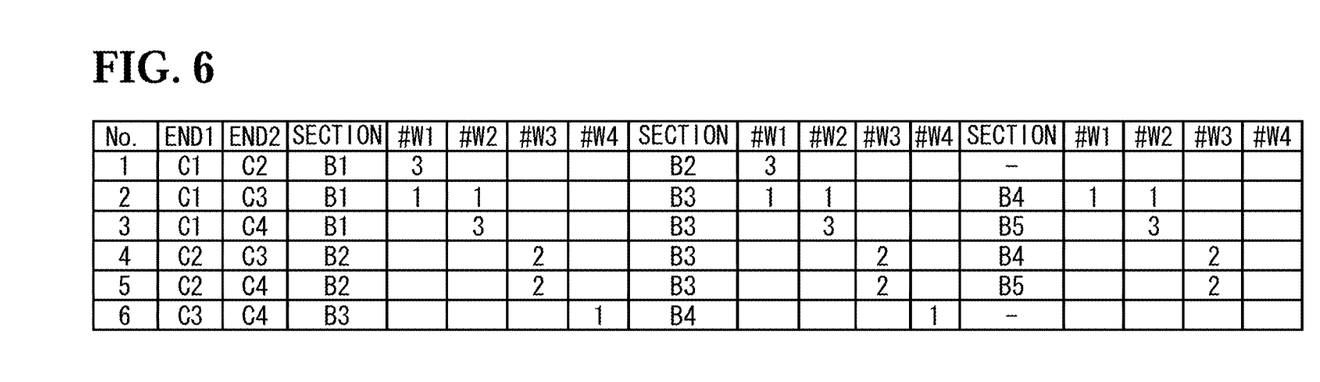
FIG. 6 is a view showing the number of electrical wires for each type belonging to the bundles.

Having retrieved the above information, the processing unit 3 checks the bundle connection information (FIG. 5) and the electrical wire-connector connection information (FIG. 3) against each other, and counts the number of electrical wires, for each type, included in each bundle (FIG. 6). Then, having found out the number of the electrical wires for each type belonging to each of the bundles B1 to B5, the processing unit 3 calculates the diameter (bundle size), so-called bundle diameter, of each of the bundles B1 to B5 with reference to wire diameters d1 to d4 of electrical wires #W1 to #W4 in the component data shown in FIG. 4 (S109 of FIG. 10, FIG. 7).

To calculate the bundle diameter D, the bundles can be divided, for example, as shown below, into a case where the bundle includes different types of electrical wires with different wire diameters and a case where the bundle includes the same type of electrical wires of the same wire diameter (where the number of the electrical wires is six or less).

Different types: $D = 1.154 \times (d_A^2 N_A + d_B^2 N_B + d_C^2 N_C \ldots)^{1/2}$ where D: Bundle diameter of bundle $d_A, d_B, d_C \ldots$: Wire diameter (diameter) of each electrical wire A, B, C . . .

$N_A, N_B, N_C \ldots$: Number of each electrical wire A, B, C . . .

Same type: $D = 1.154 \times (d_A^2 N_A + d_B^2 N_B + d_C^2 N_C \ldots)^{1/2}$

D=2d (where the number is two)
D=2.155d (where the number is three)
D=2.414d (where the number is four)
D=3d (where the number is five or six)

where d: Wire diameter (diameter) of electrical wire

The processing unit 3 uses the failure rate factors associated with the type information on the electrical wires and the connectors and the calculated bundle diameters to calculate the failure rate of each bundle between the connectors (S111 of FIG. 10, FIG. 8). Here, the value of the bundle diameter is used to calculate a second failure rate associated with the electrical wires by the following formula, for example:

Second failure rate = $\Sigma(\lambda(Mi, di, Dj) \times ni) \times Li$ where $\lambda(x)$: Failure rate function
Mi: Material of electrical wire i
di: Wire diameter of electrical wire i
D: Bundle diameter of bundle j
L: Length of bundle j
n: Number of electrical wire i
$\Sigma$: Total of failure rates of all electrical wires within section of bundle j Then, the processing unit 3 summarizes the results as the failure rate between the connectors, and calculates the total failure rate as the failure rate of the harness WH1 (S111 of FIG. 10, FIG. 9). Finally, the processing unit 3 displays the calculation results on the display unit 7 (S113 of FIG. 10).

The specific contents of step 5103 and the subsequent steps of FIG. 10 will be sequentially described below.

[Retrieval of Electrical Wire-Connector Connection Information (S103 of FIG. 10, FIG. 3)]

When calculating a failure rate, the processing unit 3 retrieves the electrical wire-connector connection information from the connection information database 51. The electrical wire-connector connection information is information in which the electrical wires belonging to each harness, the connectors directly connected at both ends of each electrical wire, and the connectors with which each electrical wire is finally connected via other electrical wire and connector, are associated with one another.

FIG. 3 shows the electrical wire-connector connection information on the harness WH1.

In the example of FIG. 3, there are 13 electrical wires belonging to the harness WH1. The connector IDs "C1" and "C2" are respectively given to the pair of connectors which are connected at both ends of the electrical wire given the wire ID "W1" among the electrical wires.

The electrical wire-connector connection information includes information (rows PIN-1, 2) about which pin (terminal) of the connectors C1 to C4 each of the electrical wires W1 to W13 is connected with.

The electrical wire-connector connection information also includes length information on each of the electrical wires W1 to W13 (row Leng.), and type information on the electrical wires (WIRE CODE) as well as type information on the connectors (CON. CODE).

The electrical wire-connector connection information shown in FIG. 3 shows that the electrical wire W1 connects the connector C1 and the connector C2 with each other; the length of the electrical wire W1 is L1; the type of the electrical wire W1 is #W1; and the types of the connectors C1 and C2 are #C1 and #C2, respectively. It is also shown that the electrical wire W9 connects the connector C2 and the connector C3 with each other; the length of the electrical wire W9 is L4; the type of the electrical wire W9 is #W3; and the types of the connectors C2 and C3 are #C2 and #C3, respectively.

[Retrieval of Failure Rate Factors (S105 of FIG. 10, FIG. 4)]

Figure 4:
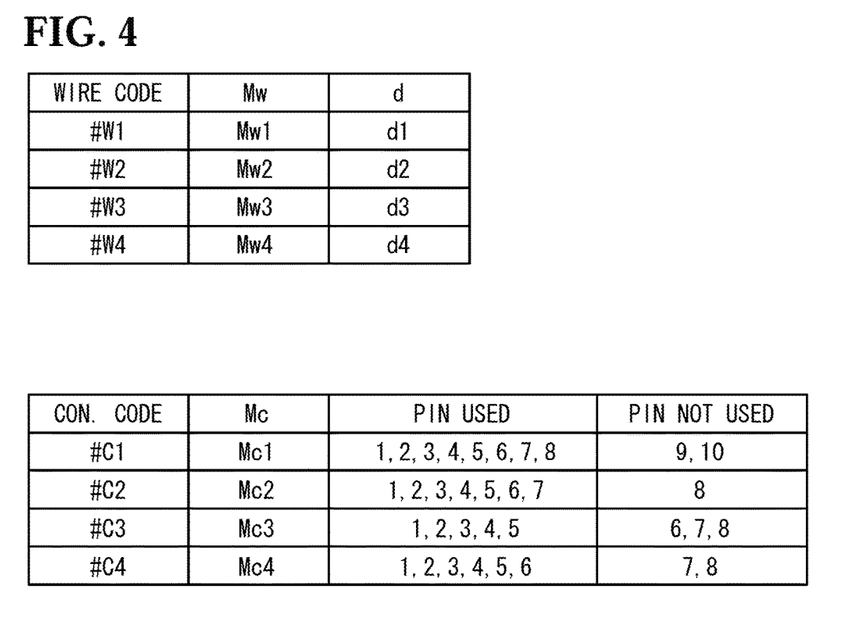
FIG. 4 is a view showing type information on the electrical wires and the connectors.

As shown in FIG. 4, the failure rate information retrieved from the storage unit 5 includes two types of information: one is information in which the type information on the electrical wires (WIRE CODE) and the materials Mw and the wire diameters d as failure rate factors are associated with each other, and the other is information in which the type information on the connectors (CON. CODE) and the materials Mc as failure rate factors are associated with each other.

FIG. 4 shows that, for example, for the electrical wire of the type #W1, the material is Mw1 and the wire diameter d is d1 as failure rate factors, and that, for the connector of the type #C1, the material is Mc1 as a failure rate factor.

Here, the failure rate factors for the electrical wires and the connectors are simply represented by the materials Mw and Mc. However, as described above, the actual failure rate is calculated by substituting a plurality of parameters into a predetermined formula, and moreover, the failure rates of electrical wires include those associated with disconnection and those associated with short-circuit. That is, the failure rate is calculated using parameters taking into account the ductility and flexibility, etc. of the individual electrical wires determined by the material Mw, and parameters taking into account the conditions of the service environment such as vibration and temperature of a place where the harness is laid.

[Calculation of Bundle Diameters of Bundles B1 to B4 (S109 of FIG. 10, FIG. 5 to FIG. 7)]

As described above, the failure rate associated with the electrical wires W1 to W13 needs to take into account the bundle diameters of the bundles B1 to B5. Therefore, the bundle diameters of the bundles B1 to B5 are calculated after the types and the numbers of the electrical wires forming each bundle are obtained by checking the electrical wire-connector connection information (FIG. 3) and the bundle connection information (FIG. 5) against each other.

As shown in FIG. 5, the bundle connection information is information in which each of the bundles B1 to B5 and the connectors and the relay points connected at both ends of the bundle are associated with each other. For example, FIG. 5 shows that the bundle B1 is arranged between the connector C1 and the relay point A1.

The number of the electrical wires is counted as follows. First, connectors making pairs (END1, END2) are listed as shown in FIG. 6. Here, to take No. 1 as an example which shows the relation between the connector C1 and the connector C2, the electrical wires which connect the connector C1 and the connector C2 with each other are the electrical wires W1, W2, W3 as shown in FIG. 3, and the bundle B1 and the bundle B2 are interposed between the connector C1 and the connector C2 via the relay point A1 as shown in FIG. 5. Thus, since all the electrical wires W1, W2, W3 belong to the bundle B1 and the bundle B2, three electrical wires belong to the bundle B1 and three electrical wires belong to the bundle B2. Since the wire codes of the electrical wires W1, W2, W3 are all #W1 as shown in FIG. 3, the number of the electrical wires identified by #W1 in the bundle B1 is three, and the number of the electrical wires identified by #W1 in the bundle B2 is three.

Similarly, to take No. 2 as an example which shows the relation between the connector C1 and the connector C3, the electrical wires which connect the connector C1 and the connector C3 with each other are the electrical wires W4, W5, and the bundle B1, the bundle B3, and the bundle B4 are interposed between the connector C1 and the connector C3 via the relay points A1, A2. Thus, since both the electrical wires W4, W5 belong to the bundle B1, the bundle B3, and the bundle B4, two electrical wires belong to each of the bundle B1, the bundle B3, and the bundle B4. Since the wire code of the electrical wire W4 is #W1 and the wire code of the electrical wire W5 is #W2 as shown in FIG. 3, in each of the bundle B3 and the bundle B4, the number of the electrical wires identified by #W1 is one and the number of the electrical wires identified by #W2 is one. FIG. 6 shows the number of the electrical wires in each bundle interposed between the pair of connectors thus obtained.

Figure 7:
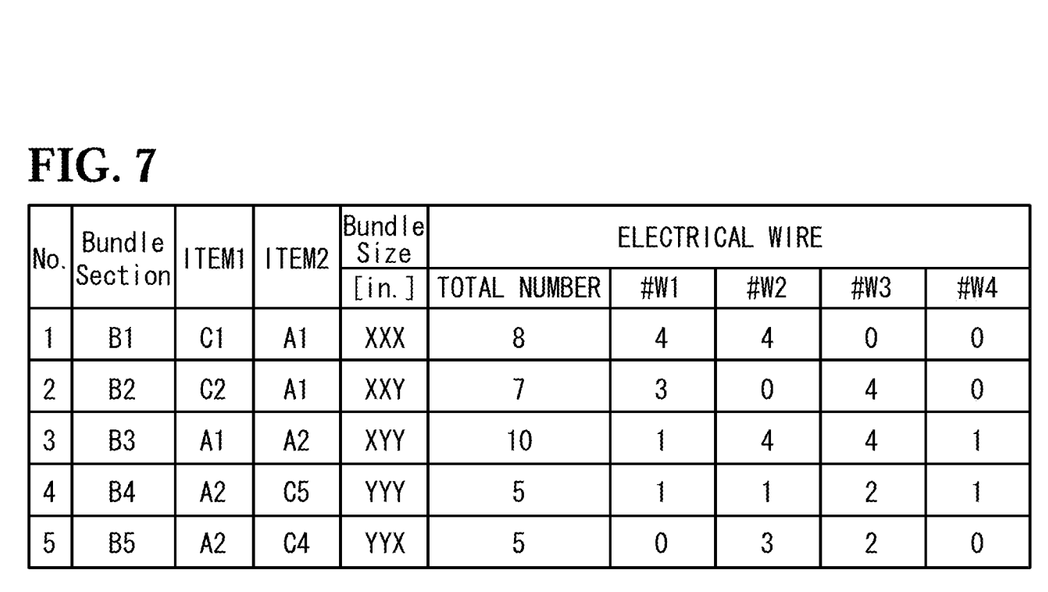
FIG. 7 is a view showing calculation results of the bundle diameters of the bundles in the wiring example of FIG. 2.
Figure 8A:
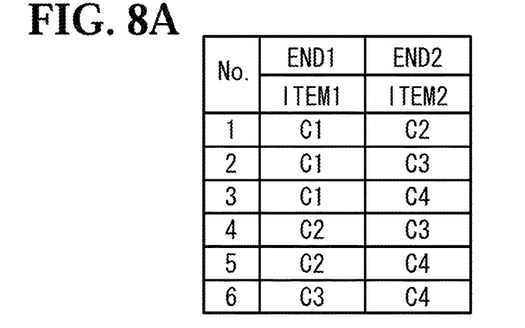
FIGS. 8A, 8B, 8C and 8D are views each showing the failure rates of the electrical wires belonging to the bundles and of the connectors.
Figure 8B:
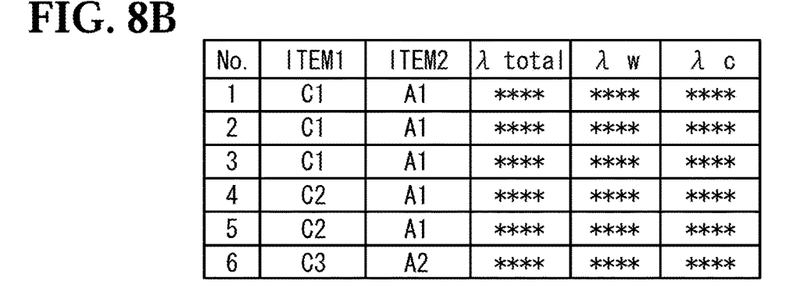
Figure 8C:
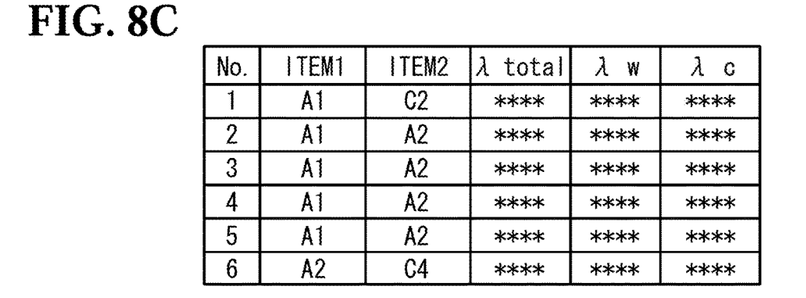
Figure 8D:
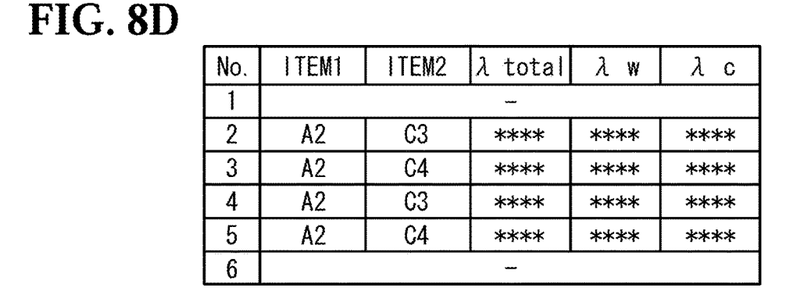
Figure 9:
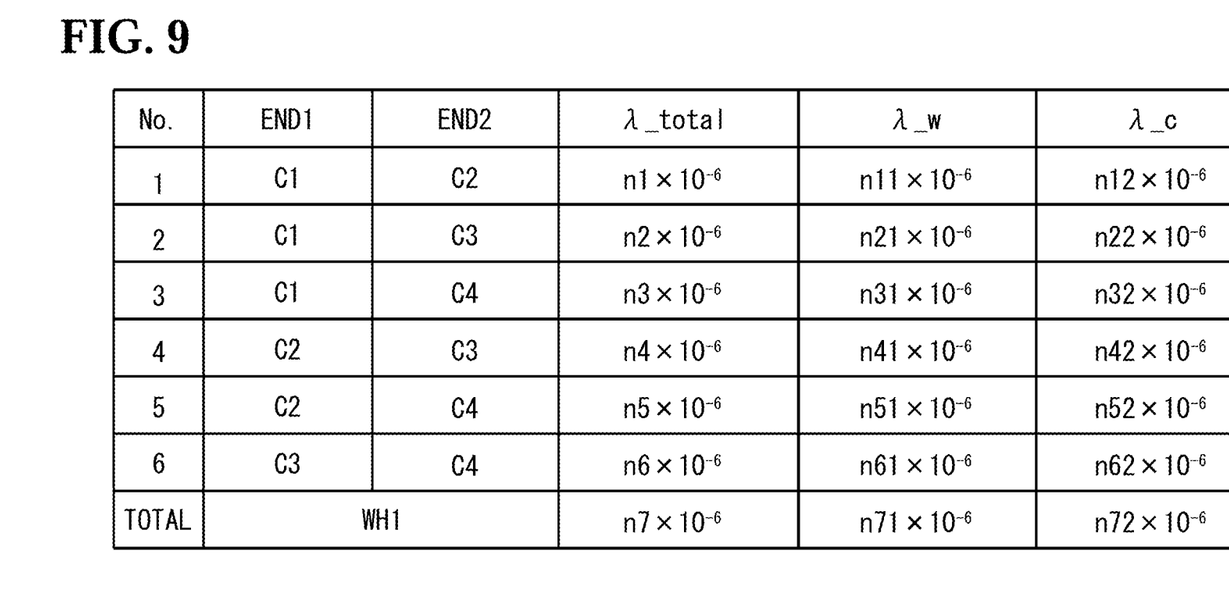
FIG. 9 is a view showing calculation results of the failure rate in the wiring example of FIG. 2.

Having found out the number of the electrical wires for each type belonging to each of the bundles B1 to B5, the processing unit 3 adds up the numbers of the electrical wires for each type, and with reference to the wire diameters d1 to d4 of the electrical wires #W1 to #W4 in the component data shown in FIG. 4, calculates the diameter (bundle size) of each of the bundles B1 to B5. FIG. 7 shows the results, with the bundles B1 to B5 and their respective diameters (bundle sizes) associated with each other.

[Failure rate calculation (S111 of FIG. 10, FIGS. 8A to 8D and FIG. 9)]

Having calculated the bundle diameters of the bundles, the processing unit 3 calculates the failure rate of each of the bundles between the pairs of connectors as shown in FIGS. 8A to 8D (S109 of FIG. 10, FIGS. 8A to 8D). Then, the processing unit 3 obtains the failure rates between the pairs of connectors and calculates the total failure rate as the failure rate of the harness WH1 (S111 of FIG. 10, FIG. 9).

Here, λw is a second failure rate associated with the electrical wires and λc is a third failure rate associated with the connectors, and λtotal is calculated as a first failure rate which is the total of the second and third failure rates. As shown in FIGS. 8A to 8D, the second failure rate is calculated by the unit of a bundle which is a bundle of electrical wires interposed between one or both of the pair of connectors and the relay elements.

It is possible to take note of any one or a plurality of electrical wires and calculate the failure rate of the applicable electrical wire between the bundles, and to thereby evaluate the design validity of a function involving that electrical wire. Moreover, since a part of the harness where the failure rate is higher can be identified and specified, effective measures for lowering the failure rate, i.e., enhancing the reliability of the wiring can be reflected in the design.

The final calculation results are displayed on the display unit 7, and with reference to these calculation results, a wire harness designer can determine whether or not the design at the current point is proper. If the calculated failure rate does not meet the required standard, the designer reviews the design and reflects the result in the electrical wire-connector connection information. That is, the designer makes a design change, such as changing the types of electrical wires and connectors to be used, and rewrites the electrical wire-connector connection information. Thereafter, the designer calculates the failure rate in the same manner to evaluate the properness of the design.

[Effects of Embodiment]

As has been described above, according to this embodiment, the electrical wire-connector connection information includes the type information, and the electrical wire-connector connection information is linked to the failure rate information which is written in the component database on the basis of the type information, so that a failure rate in the harness can be easily calculated. By performing this calculation for all the harnesses included in a system to be analyzed, the validity of the wiring design of the system can be confirmed.

Even when a design change is made, the failure rate in the harness can be calculated thereafter as well by reflecting the design change in the electrical wire-connector connection information.

Moreover, according to this embodiment, the connection information database 51 includes, as the electrical wire-connector connection information, the type information on each of the electrical wires and the connectors, and the component information database 52 includes the failure rate information on each of the electrical wires and the connectors, so that the failure rate associated with the electrical wires and the failure rate associated with the connectors can be calculated independently. Furthermore, since the electrical wire-connector connection information includes the lengths of the electrical wires, even when the failure rate varies according to the length of the electrical wire, the failure rate can be easily calculated.

As a condition for calculating the failure rate of the bundle as a whole, it is necessary to calculate the bundle diameter of the bundle. For this purpose, the bundle section information shown in FIG. 5 is provided, so that the number of the electrical wires belonging to each bundle can be counted and, as a result, the bundle diameter can be calculated.

While the present invention has been described above on the basis of the embodiment, it is possible to selectively adopt the configurations presented in the above embodiment, or appropriately modify these configurations into other configurations, within the scope of the present invention.

In the above example, final calculation results are the object to be displayed, but information generated as the processing unit 3 performs the procedure can also be displayed sequentially on the display unit 7.

The wiring example used for the description of the embodiment is merely an example, and it goes without saying that the present invention is applicable to other wiring examples as well.

There is no limitation on devices, apparatuses, etc. to which the present invention is applied, and the present invention is applicable to various devices and apparatuses in which terminal devices and relay devices are connected with one another through cables.

Furthermore, the failure rate calculation device 10 is preferably used for designing and/or building a large wiring system, which is for example mounted on an aircraft, while the device 10 is also preferably used for producing a large wiring system and/or a large number of wire harnesses partly constituting the wiring system, which are for example mounted on an aircraft.

What is claimed is:

1. A failure rate calculation device which calculates the failure rate of a wire harness of which each of a plurality of electrical wires is connected via a relay element with a pair of connectors located at terminal ends of the electrical wires, the device comprising:

a storage unit which stores electrical wire-connector connection information in which each of the plurality of electrical wires and the pair of connectors are associated with each other and in which type information on the electrical wires and type information on the connectors are associated with each other, and failure rate information in which the type information on the electrical wires and the type information on the connectors belonging to the electrical wire-connector connection information and failure rate factors, which are associated with the type information, are associated with each other; and a processing unit which, when the wire harness is specified, checks the electrical wire-connector connection information and the failure rate information against each other and calculates a failure rate associated with the wire harness.

2. The failure rate calculation device according to claim 1, wherein the processing unit checks the electrical wire-connector connection information about the type information on the electrical wires and the failure rate information about the electrical wires against each other, and calculates a second failure rate associated with the electrical wires.

3. The failure rate calculation device according to claim 2, wherein the processing unit checks the electrical wire-connector connection information about the type information on the connectors and the failure rate information about the connectors against each other, and calculates a third failure rate associated with the connectors.

4. The failure rate calculation device according to claim 3, wherein the processing unit calculates a first failure rate as the total of the second failure rate and the third failure rate.

5. The failure rate calculation device according to claim 4, wherein
the storage unit stores, as the electrical wire-connector connection information, length information in which the plurality of electrical wires and their respective lengths are associated with each other, and
the processing unit calculates the second failure rate taking into account the length information as well.

6. The failure rate calculation device according to claim 2, wherein the processing unit calculates the second failure rate for a bundle of the electrical wires interposed between one or both of the pair of connectors and the relay elements.

7. The failure rate calculation device according to claim 6, wherein the processing unit uses a diameter of the bundle to calculate the second failure rate for the bundle.

8. The failure rate calculation device according to claim 1, wherein the processing unit checks the electrical wire-connector connection information about the type information on the connectors and the failure rate information about the connectors against each other, and calculates a third failure rate associated with the connectors.

9. The failure rate calculation device according to claim 8, wherein the processing unit calculates a first failure rate as the total of a second failure rate and the third failure rate.

10. The failure rate calculation device according to claim 9, wherein
the storage unit stores, as the electrical wire-connector connection information, length information in which the plurality of electrical wires and their respective lengths are associated with each other, and
the processing unit calculates the second failure rate taking into account the length information as well.

11. The failure rate calculation device according to claim 1, wherein
the storage unit stores bundle connection information which shows a connection relation between bundles and one or both of the connectors and the relay elements in the wire harness, and
the processing unit calculates the failure rate by further checking the bundle connection information.

12. The failure rate calculation device according to claim 1, wherein the failure rate factors include a material of each of the electrical wires, a diameter of each of the electrical wires, or the material and the diameter of each of the electrical wires.

13. The failure rate calculation device according to claim 1, wherein the failure rate factors include a material of the pair of connectors.

14. A method for producing a wiring system, the wiring system including a wire harness of which each of a plurality of electrical wires is connected via a relay element with a pair of connectors located at terminal ends of the electrical wires, wherein the wiring system is produced based on a design for a wiring system created by using the failure rate calculation device according to claim 1.

15. The method for producing a wiring system according to claim 14, wherein the wire harnesses interconnect an input device, a control device, and an output device.

16. The method for producing a wiring system according to claim 14, wherein the wiring system is mounted on an aircraft.

17. A method for producing a wire harness of which each of a plurality of electrical wires is connected via a relay element with a pair of connectors located at terminal ends of the electrical wires, wherein the wire harness is produced based on a design for a wiring system created by using the failure rate calculation device according to claim 1.

18. The method for producing a wire harness according to claim 17, wherein the wire harness is mounted on an aircraft.

19. A method for calculating a failure rate of a wire harness of which each of a plurality of electrical wires is connected via a relay element with a pair of connectors located at terminal ends of the electrical wires, the method comprising steps of using the device according to claim 1 to perform:
retrieving electrical wire-connector connection information in which each of the plurality of electrical wires and the pair of connectors are associated with each other and in which type information on the electrical wires and type information on the connectors are associated with each other;
retrieving failure rate information in which the type information on the electrical wires and the type information on the connectors belonging to the electrical wire-connector connection information and failure rate factors, which are associated with the type information, are associated with each other; and
checking, when the wire harness is specified, the electrical wire-connector connection information and the failure rate information against each other to calculate a failure rate associated with the wire harness.

20. The method for calculating a failure rate of a wire harness according to claim 19, wherein the method further comprises a step of retrieving bundle connection information which shows a connection relation between bundles and one or both of the connectors and the relay elements in the wire harness.

* * * * *